(12) United States Patent
Martinez et al.

(10) Patent No.: US 7,590,779 B2
(45) Date of Patent: Sep. 15, 2009

(54) DETERMINING LATENCY AND PERSISTENCY OF STORAGE DEVICES AND PRESENTING A SAVE/READ USER INTERFACE THROUGH ABSTRACTED STORAGE

(75) Inventors: Gregory A. Martinez, Seattle, WA (US); Brian Lloyd Schmidt, Bellevue, WA (US); Christopher Pirich, Seattle, WA (US); Jeffrey Edward Simon, Sammamish, WA (US); Jon Marcus Randall Whitten, Sammamish, WA (US); Michael Cory Maston, Sammamish, WA (US); Tyler Scott Carper, Sammamish, WA (US); Yasser B. Asmi, Redmond, WA (US); Richard Henry Irving, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 300 days.

(21) Appl. No.: 10/977,643

(22) Filed: Oct. 29, 2004

(65) Prior Publication Data

US 2006/0095619 A1    May 4, 2006

(51) Int. Cl.
*G06F 13/38* (2006.01)
*G06F 12/00* (2006.01)
(52) U.S. Cl. .............. 710/72; 710/15; 710/36; 710/40; 710/74; 707/200

(58) Field of Classification Search ............... None
See application file for complete search history.

(56) References Cited

U.S. PATENT DOCUMENTS

| 5,666,538 | A  | * | 9/1997  | DeNicola ............ 713/320 |
| 5,790,886 | A  | * | 8/1998  | Allen ................ 710/5   |
| 6,061,788 | A  | * | 5/2000  | Reynaud et al. ....... 713/2  |
| 6,470,420 | B1 | * | 10/2002 | Hospodor ............. 711/114 |
| 2001/0034795 | A1 | * | 10/2001 | Moulton et al. ...... 709/244 |
| 2001/0049779 | A1 | * | 12/2001 | Shimada et al. ...... 711/205 |
| 2004/0095950 | A1 | * | 5/2004  | Shirogane et al. .... 370/428 |
| 2005/0033936 | A1 | * | 2/2005  | Nakano et al. ....... 711/170 |

OTHER PUBLICATIONS

Random House, Dictionary.com, Keyword: Persistence.*

* cited by examiner

*Primary Examiner*—Eron J Sorrell
*Assistant Examiner*—Dean Phan
(74) *Attorney, Agent, or Firm*—Woodcock Washburn LLP

(57) ABSTRACT

A system and method for enabling users and developers to store data on a number of different types of local and remote devices connected to a multimedia console or a gaming console. The range of available storage devices creates issues that are addressed to avoid apparent inconsistencies in storage performance (e.g. latency). A consistent method of reading and writing data is provided such that end users and developers do not have to be concerned with restrictions and limitations inherent to various devices.

13 Claims, 4 Drawing Sheets

DETERMINING LATENCY AND PERSISTENCY OF STORAGE DEVICES AND PRESENTING A SAVE/READ USER INTERFACE THROUGH ABSTRACTED STORAGE

COPYRIGHT NOTICE/PERMISSION

A portion of the disclosure of this patent document contains material, which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings hereto: Copyright© 2004, Microsoft Corporation, All Rights Reserved.

FIELD OF THE INVENTION

This invention generally relates to the field of multimedia devices and gaming consoles. In particular, the present invention is directed to a system architecture in a gaming device that provides a single user interface for reading and writing data to multiple, different storage devices.

BACKGROUND OF THE INVENTION

In conventional multimedia systems, such as gaming consoles, the numerous options to which data can be saved and retrieved presents problems for developers. In particular, because of the differences in the latency and persistency of storage devices, developers often have to implement different processes (and sometimes different user interfaces) to access different storage devices. This creates a confusing and inconsistent user experience.

In addition to the above, as storage devices are added and removed from the system, it is difficult to notify applications and users of the existence or non-existence of storage devices. Further, conventional multimedia systems do not have provisions to add storage devices that may be developed in the future. Therefore, new storage options cannot be added, which may prevent users from storing and retrieving data from preferred locations.

Thus, there is a need for a system and method for providing a consistent user experience when saving and reading data to and from different storage devices. There is also a need for a system for determining the presence of storage devices and for determining an estimated time to save data based on the specifics of the storage device. The present invention provides such a solution.

SUMMARY OF THE INVENTION

The present invention enables an application user to store data to various storage devices (e.g. hard disk drive (HDD), MU, networked PC, server storage) that are connected to an multimedia/gaming console. Using a storage device UI, the user can easily select an appropriate storage device to store data. The latency and persistency of storage devices may be presented as part of a save/read UI. The UI provides approximate save times for different storage devices.

In accordance with the present invention, there is provided a method for reading/writing data from one of multiple, diverse storage devices communicatively connected to a multimedia console. The method includes determining a latency and persistency of storage devices connected to the multimedia console; detecting an event requesting to read/write data; presenting a user interface displaying the storage devices and an estimated time to read/write the data; and receiving an input selecting a particular storage device from which the data is to be read/written.

In accordance with features of the invention, a default storage device may be set based on the persistency of the storage devices. An estimated time to read/write data to a storage device may be derived in accordance with a latency of each storage device. A progress status bar may be provided during each read/write to a particular storage device.

A set of APIs may be exposed to provide a common system save user interface (e.g., a simple read/write) or an application-specific save user interface (e.g., a flexible read/write). Silent reads/writes may be provided for data known to an application where data is read/written without user intervention (e.g., a quick or 'checkpoint' save).

Additional features and advantages of the invention will be made apparent from the following detailed description of illustrative embodiments that proceeds with reference to the accompanying drawings.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings.

DETAILED DESCRIPTION OF ILLUSTRATIVE EMBODIMENTS

Figure 1:
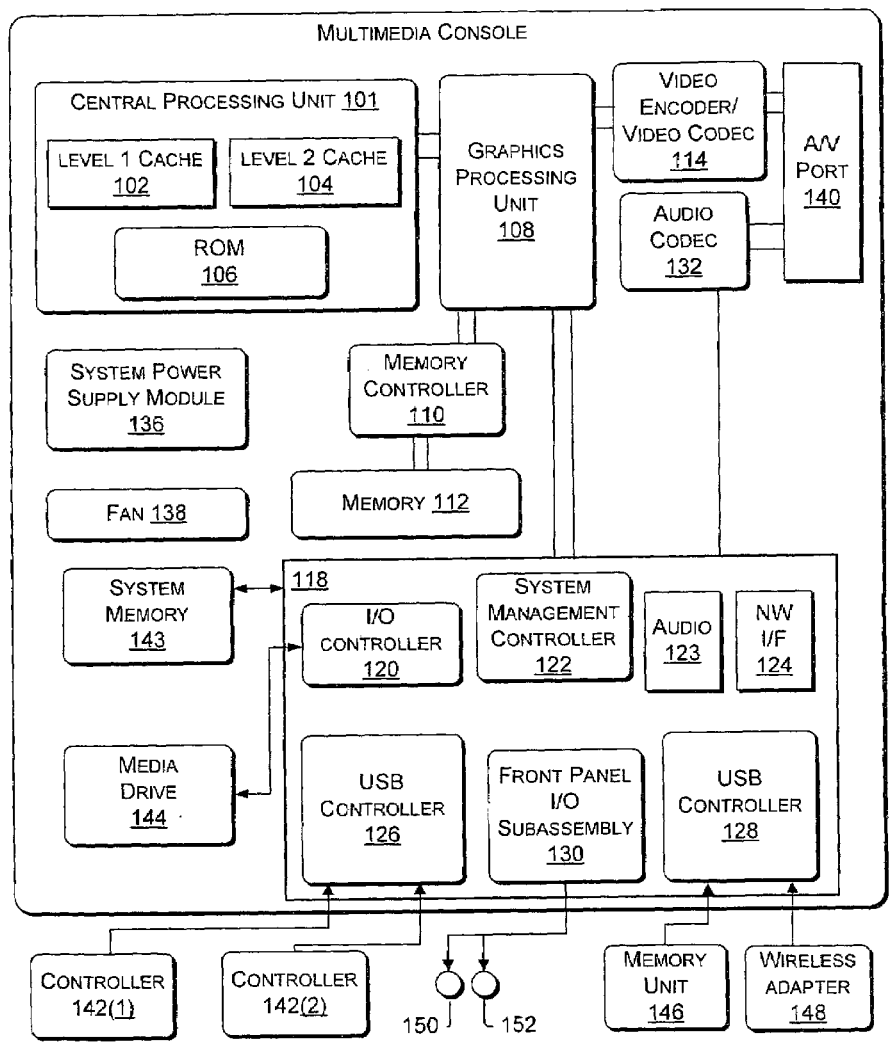
FIG. 1 is a block diagram showing a multimedia console in which aspects of the present invention may be implemented.

FIG. 1 illustrates the functional components of a multimedia console 100 in which certain aspects of the present invention may be implemented. The multimedia console 100 has a central processing unit (CPU) 101 having a level 1 cache 102, a level 2 cache 104, and a flash ROM (Read Only Memory) 106. The level 1 cache 102 and a level 2 cache 104 temporarily store data and hence reduce the number of memory access cycles, thereby improving processing speed and throughput. The CPU 101 may be provided having more than one core, and thus, additional level 1 and level 2 caches 102 and 104. The flash ROM 106 may store executable code that is loaded during an initial phase of a boot process when the multimedia console 100 is powered ON.

A graphics processing unit (GPU) 108 and a video encoder/video codec (coder/decoder) 114 form a video processing pipeline for high speed and high resolution graphics processing. Data is carried from the graphics processing unit 108 to the video encoder/video codec 114 via a bus. The video processing pipeline outputs data to an A/V (audio/video) port 140 for transmission to a television or other display. A memory controller 110 is connected to the GPU 108 to facilitates processor access to various types of memory 112, such as, but not limited to, a RAM (Random Access Memory).

The multimedia console 100 includes an I/O controller 120, a system management controller 122, an audio processing unit 123, a network interface controller 124, a first USB host controller 126, a second USB controller 128 and a front panel I/O subassembly 130 that are preferably implemented on a module 118. The USB controllers 126 and 128 serve as hosts for peripheral controllers 142(1)-142(2), a wireless adapter 148, and an external memory device 146 (e.g., flash memory, external CD/DVD ROM drive, removable media, etc.). The network interface 124 and/or wireless adapter 148 provide access to a network (e.g., the Internet, home network, etc.) and may be any of a wide variety of various wired or wireless interface components including an Ethernet card, a modem, a Bluetooth module, a cable modem, and the like.

System memory 143 is provided to store application data that is loaded during the boot process. A media drive 144 is provided and may comprise a DVD/CD drive, hard drive, or other removable media drive, etc. The media drive 144 may be internal or external to the multimedia console 100. Application data may be accessed via the media drive 144 for execution, playback, etc. by the multimedia console 100. The media drive 144 is connected to the I/O controller 120 via a bus, such as a Serial ATA bus or other high speed connection (e.g., IEEE 1394).

The system management controller 122 provides a variety of service functions related to assuring availability of the multimedia console 100. The audio processing unit 123 and an audio codec 132 form a corresponding audio processing pipeline with high fidelity and stereo processing. Audio data is carried between the audio processing unit 123 and the audio codec 132 via a communication link. The audio processing pipeline outputs data to the A/V port 140 for reproduction by an external audio player or device having audio capabilities.

The front panel I/O subassembly 130 supports the functionality of the power button 150 and the eject button 152, as well as any LEDs (light emitting diodes) or other indicators exposed on the outer surface of the multimedia console 100. A system power supply module 136 provides power to the components of the multimedia console 100. A fan 138 cools the circuitry within the multimedia console 100.

The CPU 101, GPU 108, memory controller 110, and various other components within the multimedia console 100 are interconnected via one or more buses, including serial and parallel buses, a memory bus, a peripheral bus, and a processor or local bus using any of a variety of bus architectures. By way of example, such architectures can include a Peripheral Component Interconnects (PCI) bus, PCI-Express bus, etc.

When the multimedia console 100 is powered ON, application data may be loaded from the system memory 143 into memory 112 and/or caches 102, 104 and executed on the CPU 101. The application may present a graphical user interface that provides a consistent user experience when navigating to different media types available on the multimedia console 100. In operation, applications and/or other media contained within the media drive 144 may be launched or played from the media drive 144 to provide additional functionalities to the multimedia console 100.

The multimedia console 100 may be operated as a standalone system by simply connecting the system to a television or other display. In this standalone mode, the multimedia console 100 allows one or more users to interact with the system, watch movies, or listen to music. However, with the integration of broadband connectivity made available through the network interface 124 or the wireless adapter 148, the multimedia console 100 may further be operated as a participant in a larger network community.

When the multimedia console 100 is powered ON, a set amount of hardware resources are reserved for system use by the multimedia console operating system. These resources may include a reservation of memory (e.g., 16 MB), CPU and GPU cycles (e.g., 5%), networking bandwidth (e.g., 8 kbs), etc. Because these resources are reserved at system boot time, the reserved resources do not exist from the application's view.

In particular, the memory reservation preferably is large enough to contain the launch kernel, concurrent system applications and drivers. The CPU reservation is preferably constant such that if the reserved CPU usage is not used by the system applications, an idle thread will consume any unused cycles.

With regard to the GPU reservation, lightweight messages generated by the system applications (e.g., popups) are displayed by using a GPU interrupt to schedule code to render a UI into an overlay. The amount of memory required for an overlay depends on the overlay area size and the overlay preferably scales with screen resolution. Where a full user interface is used by the concurrent system application, it is preferable to use a resolution independent of application resolution. A scaler may be used to set this resolution such that the need to change frequency and cause a TV resynch is eliminated.

After the multimedia console 100 boots and system resources are reserved, concurrent system applications execute to provide system functionalities. The system functionalities are encapsulated in a set of system applications that execute within the reserved system resources described above. The operating system kernel identifies threads that are system application threads versus gaming application threads. The system applications are preferably scheduled to run on the CPU 101 at predetermined times and intervals in order to provide a consistent system resource view to the application. The scheduling is to minimize cache disruption for the gaming application running on the console.

When a concurrent system application requires audio, audio processing is scheduled asynchronously to the gaming application due to time sensitivity. A multimedia console application manager (described below) controls the gaming application audio level (e.g., mute, attenuate) when system applications are active.

Input devices (e.g., controllers 142(1) and 142(2)) are shared by gaming applications and system applications. The input devices are not reserved resources, but are to be switched between system applications and the gaming application such that each will have a focus of the device. The application manager preferably controls the switching of input stream, without knowledge the gaming application's knowledge and a driver maintains state information regarding focus switches.

During operation of the console 100, users will be provided options to store data to a large number of locations that are both local (e.g. MU 146, a hard disk drive, etc.) and remote (e.g. networked PC, server storage space, etc.). The present invention is directed to a system and method of "abstracted storage" that generically exposes storage to end users and developers. In other words, storage devices are exposed as abstract units to a game/application on the console 100 while allowing the game/application to discover content related to it across all devices. This way, reading and writing data occurs in a consistent fashion for every storage device. This allows users to access all potential storage locations that exist in a similar fashion. It also makes it unnecessary for developers to be aware of the type of storage device that data is being transferring to/from and provides a simple and consistent experience for end users.

The present invention allows an application to discover where/if a particular file exists simply by knowing a type of file the application is looking for. For example, a user may store a "save game" on a device the application/game has no direct knowledge of. When the application/game starts, it can ask the abstracted storage subsystem to find all saved games for this user on all available storage devices. Then, without knowing specifically what device the file is on, data is read into the application/game.

The diversity of these storage types raises issues with regard to when storage is treated generically (i.e., saving applications to any storage device) and when it is treated specifically (i.e., while playing an application, writing to a memory unit is faster than writing to a networked PC). As will be described below, the present invention accounts for the specifics of each storage device, such as the amount of space on the device, latency reading from/writing to the device, and the persistence of the device.

There are many types of data that may be saved to storage devices in accordance with the present invention. Those of ordinary skill in the art will appreciate that the types noted below are provided for exemplary purposes are not an exhaustive list of all types of data. The first type of data includes application data such as application saves and title saves. Application saves typically result from a user induced event, such as a save point and quick saves. Quick saves are 'checkpoint' saves where users are provided feedback that they have reached a 'checkpoint' and a save is made. Title saves are data from an application title (i.e., a game). Typically, title saves result from installing files from the application disk to the HDD. Title data may also be used to save changes to the application environment (e.g., a tree was destroyed during a fight, or an item was picked up, etc.).

A second type of data are auto-updates. This category of data may include security patches for the console 100 or other services provide by the console 100. Downloaded Content (DLC) is another type and is content provided by developers through a network service. These DLCs can range from around 1 MB to approximately 100 MB. A fourth type of data is user created content. This content may be created on the console 100 or a networked personal computer. A fifth type of data is system applications, which provided services to the console 100. A sixth type of data is device drivers.

The following is a non-limiting list of exemplary devices to which users can save data. Local devices include memory units 146, 148, an internal hard drive 144, a USB drive, flash memory, an application disk, etc. Remote devices include a networked PC (or other computing device), a network service storage space, or portable media player device, etc. Each storage device has specific characteristics that are advantageous and disadvantageous for saving data. The limitations and differences for each storage type is managed by the present invention as part of the abstracted storage mechanism. Some of the limitations include size, device location (local vs. remote), performance (latency, network speed), reliability, and persistency.

Table 1 below illustrates exemplary storage devices and their strengths/weaknesses with respect to the characteristics noted above. This table identifies several devices (e.g., the internal HDD and the MU) that are preferable destinations for saved data. This information may be used when determining "default" storage preferences.

TABLE 1

| Storage Device Type | Size | Location | Speed | Reliability | Persistence |
|---|---|---|---|---|---|
| Flash ROM | Very Small | Local | Fast | High | High |
| Memory Unit | Small | Local | Medium | High | Medium |
| Internal Hard Drive | Large | Local | Fast | High | High |
| Add-On Hard Drive | Large | Local | Fast | High | High |
| Networked PC | Large | Remote | Variable | Low | Low |
| Networked service server space | Large | Remote | Variable | Low | Medium |

When the multimedia console 100 has control, it is preferable to imbue each storage device with the information in Table 2 that can be used by Read/Write APIs (discussed below). Additional storage properties may be added.

TABLE 2

| Storage Device ID | Type | Persistence Level | Speed | Location | Value |
|---|---|---|---|---|---|
| Flash ROM | Flash | High | Fast | Local | 1 |
| Application Title Disk | DVD | Low | Medium | Local | 2 |
| MU | Flash | Medium | Medium | Local | 3 |
| Internal HDD | HDD | High | Fast | Local | 4 |
| Add On HDD | HDD | High | Fast | Local | 5 |
| Networked PC | HDD | Low | Slow | Remote | 6 |
| Networked Service Storage Space | HDD | Low | Slow | Remote | 7 |

Table 3 illustrates the speed/latency for accessing data as well the speed for reading from/writing to a storage device. As can be understood there is a great amount of variability between storage devices. The network service storage space is the slowest storage device. A 128 k/sec (or even 64 k/sec) read/write speed may be used for a base model for saving data to that specific remote storage destination. This wide variability exposes the difficulty of making all storage devices appear generic to the end users.

TABLE 3

| Latency Projections by Device | Access Latency | Read Speed | Write Speed |
|---|---|---|---|
| Memory Unit | Under 1 ms (No Seek Time) | 8 MB/Sec | 2.5 MB/Sec |
| Internal Hard Drive | 15 ms Seek/Access Time | 17-34 MB/Sec | Similar speeds due to caching |
| Networked PC | 10 MB/sec Across Network plus HDD Seek Time | Bottlenecked by Bandwidth | Bottlenecked by Bandwidth |
| Network Service Server Storage | Large Variation (128 k/sec) | Bottlenecked by Downstream Bandwidth | Bottlenecked by Upstream Bandwidth |

Using these options advantageously deals with issues of persistency, new storage devices and overflow. Persistency issues arise when events such as a user intended removal (e.g. pull out MU) and unintended removal (e.g. someone turned off the Networked PC) requires developers to generate a range of error messages for end users. Also, a wireless network may be experiencing interference problems and packets are continually dropped without allowing the end user to complete read or write commands. When a new device is added to the console 100 (such as an internal HDD or a networked service server storage space), the present invention checks for new storage devices every time an application reads/writes data from the console. When a device is full, the present invention assigns a default device for end users based on other storage devices that are available. Also, an error message may be provided to the user.

Figure 2:
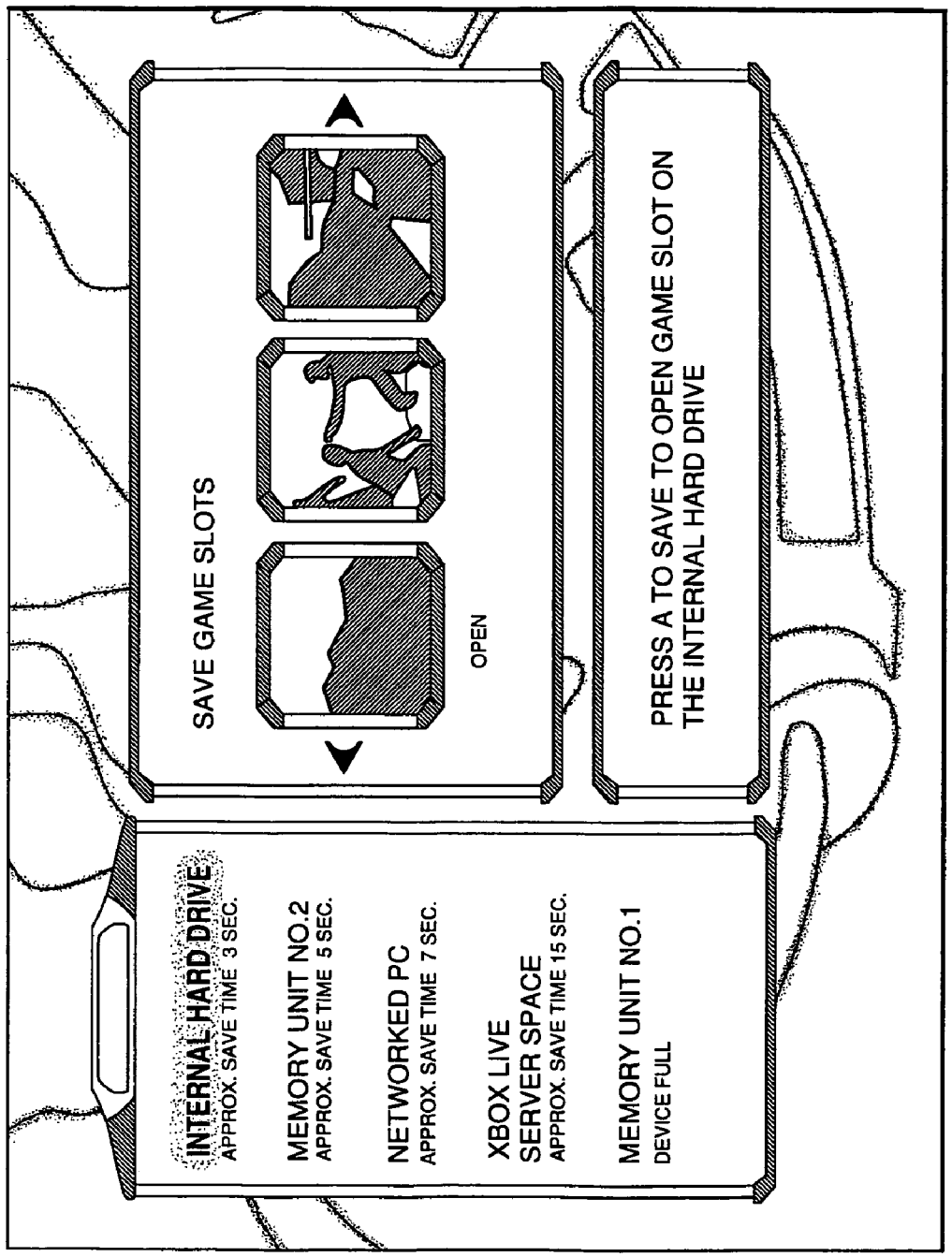
FIG. 2 is an exemplary user interface for reading/saving data to multiple, different storage locations.

Referring now to FIG. 2, there is illustrated a System Save user interface (UI). The UI is called using, e.g., a System Save UI API and allows the console 100 to provide estimated save times to various destinations. The UI of FIG. 2 can be used by applications and end users to save data to one of any connected storage devices in response to a user initiated save. It may include parameters that allow the application to set the total number of units of saved data (slots) a user can save to. The application may chose to add its own skin or theme to the system UI, etc.

Figure 3:
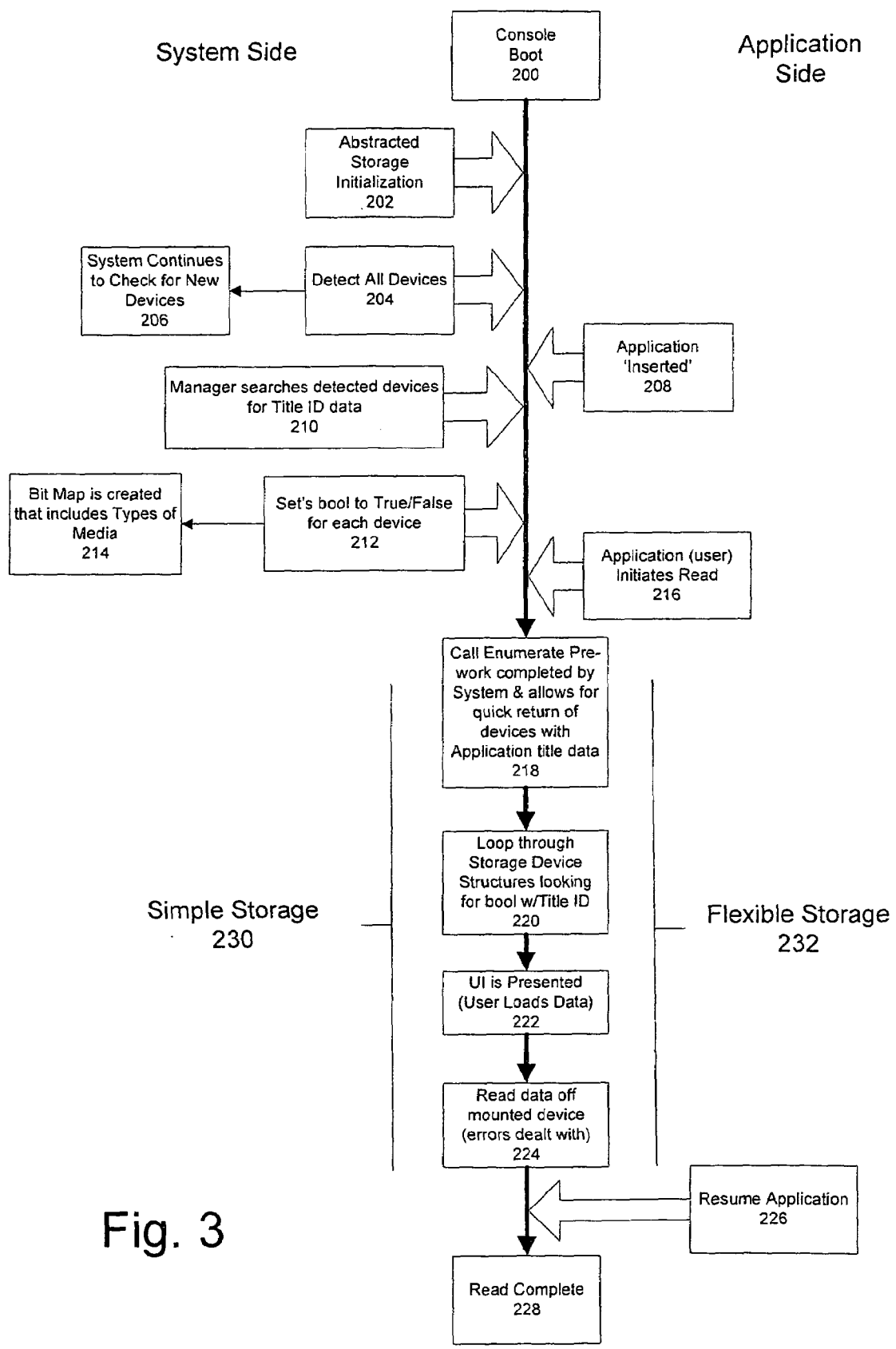
FIG. 3 is a flow chart of the processes performed to read data from storage devices.

Referring to FIG. 3, the processes performed on the exemplary console 100 will now be described for reading data from a storage device or devices. At step 200, the console 100 boots and the abstracted storage initialization begins at step 202. At step 204 the console detects all devices and checks for new devices at step 206. An API (or APIs) may be exposed to detect and enumerate all storage devices that are connected to the console 100 along with characteristic about each device that is present. This API may be responsible for tracking insertions/removals of storage device, mounting devices, digitally signing data, etc. At step 208, an application is inserted into the console 100. At step 210, an application manager searches the detected devices for title ID data related to the application. At step 212, a Boolean variable is set to true/false for each device where the application title on the storage media is equal to application title data on device. A bit map is created at step 214 that includes all types of media.

At step 216, a user or application initiated read occurs. At step 218, control is passed to a system application or API to enumerate devices and at step 220 the routine loops through device structures looking for devices that have storage associated with the current Title ID. At step 222, the UI of FIG. 2 is presented. At step 224, data is read from the mounted device. Control is returned to the application at step 226 and the read is complete at step 228.

The present invention provides applications with the choice of using a common System Save UI or implementing their own save UI through exposed APIs. The first choice is a simple storage model 230 that is provided as part of a high level Simple API. Here, the application calls an API and has the benefit of the System Save UI (FIG. 2). This option provides the application title with the ability to skin the UI so that it fits the feel of the application title. In addition, it provides via several simple parameters a mechanism by which to alter the UI (e.g. number of save application slots available to end user). Simple storage is useful because it allows for the application title to call a high level API and pass data to the console 100. The console 100 enumerates storage devices, presents standard UI, saves/writes data, checks for errors and, optionally, digitally sign the data file. This method is preferable for many applications that want to save simple application data or title data and allows the application title to avoid dealing with a wide range of errors and issue that may cause problems (e.g. persistent/non-persistent memory devices).

The second is a flexible storage model 232 that allows the application to use low level APIs for storage, but may call the System Save UI in the process. Flexible storage may be preferable for applications that require a richer save data protocol, such as multiple files, slotted saves, or subdirectory creation. The flexible storage model may be used by application programmers that want to present a unique user interface/experience with the storage process or to provide unique, additional functionality not provided in the Simple method. Flexible Storage offers applications the flexibility of accessing low level APIs to achieve their goals but requires that the title deal with file enumeration and creating a Save/Write UI. Applications that use the Flexible storage APIs may create their own UI or call a System Save UI API to perform the save/load UI. Regardless of the save model, steps 218-224 are performed.

To perform a simple save, one or more APIs may be provided. Functionally, a primary API may be called for finding and reading save data (e.g. application saves, screenshots, etc) from all possible storage devices. When the user initiates "load data" from an application's UI, the application calls a data read API that may call an application or API to detect locations where possible saved data may be stored. Next, a UI is presented with saved data from which the user may select a device having specific data. The system then requests the device, where it is determined if the device supports the operation requested by the calling API (such as a read/write operation). It is noted that the device may be may automated by a system function, such as a media player abstracting the physical location of a song.

If the device acquisition succeeds, a well-known storage location for the content container requested is mounted. In the case of a saved game, this may be the user directory of the title's assigned location on the device. This location will vary for other types of content, but a well-known location will be assigned for all categories of content on the system. Next, the content being requested may be validated. These validation checks may include signature verification or flagging content as untrusted in the case of user created content. The content may be decompressed if the requested data is already compressed. Error messages, if any, that are appropriate may be presented to the user (e.g. networked PC no longer available, etc). Control then returns to application, which continues, using the saved data as returned by the system UI.

A "silent" data read may be performed to allow application titles to access an entire data file without calling up the System Save UI of FIG. 2. The user may have already saved to a location and the application title knows the destination of the data. For this type of data read, the application calls an API passing, e.g., a unique identifier, the type of content (e.g., save game), and other flags associated with the processing of the content (i.e. security information). In accordance with the present invention, the call to the API may be synchronous or asynchronous. The system initiates read for the data file and mounts appropriate drive for storage device (e.g. a letter drive for HDD User data). The system then reads the data file and passes on to application title. If the storage device does not exist the application title presents a UI to reconnect device and the application is informed if the data file no longer exists on device. The system then unmounts the corresponding drive and returns control to application where the application continues. A similar operation may be performed to read title data, however, because title data is stored on a local hard drive, it is most likely that the hard drive will exist at all times.

To perform a flexible storage read, a lower level set of storage APIs may be used such that the application is able to access storage at a lower level. The application handles the various cases of media insertion and removal, enumeration of data across devices and so on. For a flexible storage read data operation, the following exemplary sequence may occur. First, the user navigates to the application UI to load application data. The application calls a predetermined API to find all available storage devices. The application UI is populated based on data type selected (e.g. screenshots versus application saves, etc) and the user selects desired application data. The drive is mounted and the application uses APIs to read the application data. The application must deal with all error messages (e.g. device stops persisting, data read fails due to packet loss etc). After the application title completes a data read, it informs the system it is done with the data read. The system then unmounts the corresponding drive and application play resumes.

To perform a flexible silent data read, the application title reads a data file without calling up the System Save UI. This may be done because an application only wants to be aware of data in a specific directory (e.g. inventory data) and not the entire data file. This process is used in conjunction with the flexible storage save process where an application title has saved a complex data structure (e.g. directory/subdirectory) and has already determined a destination where the data resides. The user must have already saved to location and application title must know destination of data. In performing a flexible silent data read, the application issues a search by calling an API. The system returns a data structure representing the data found to the application. The found data may be "content type" such as saved game, display name or simply "name." Optionally, a unique identifier of the user associated with the data and a pointer to more data identifying the device on which it is stored may be returned. The application then uses one of the data structures in another function call to mount the storage device and start reading the data.

The system initiates read for the data file and mounts an appropriate drive for storage device (e.g. a letter drive for HDD User data). If the storage device does not exist the application title must present a UI to reconnect device and the application is informed if the data file no longer exists on device. Next, the system unmounts the corresponding drive and control returns to application. A similar operation may be performed to read title data, however, because title data is stored on a local hard drive, it is most likely that the hard drive will exist at all times.

Figure 4:
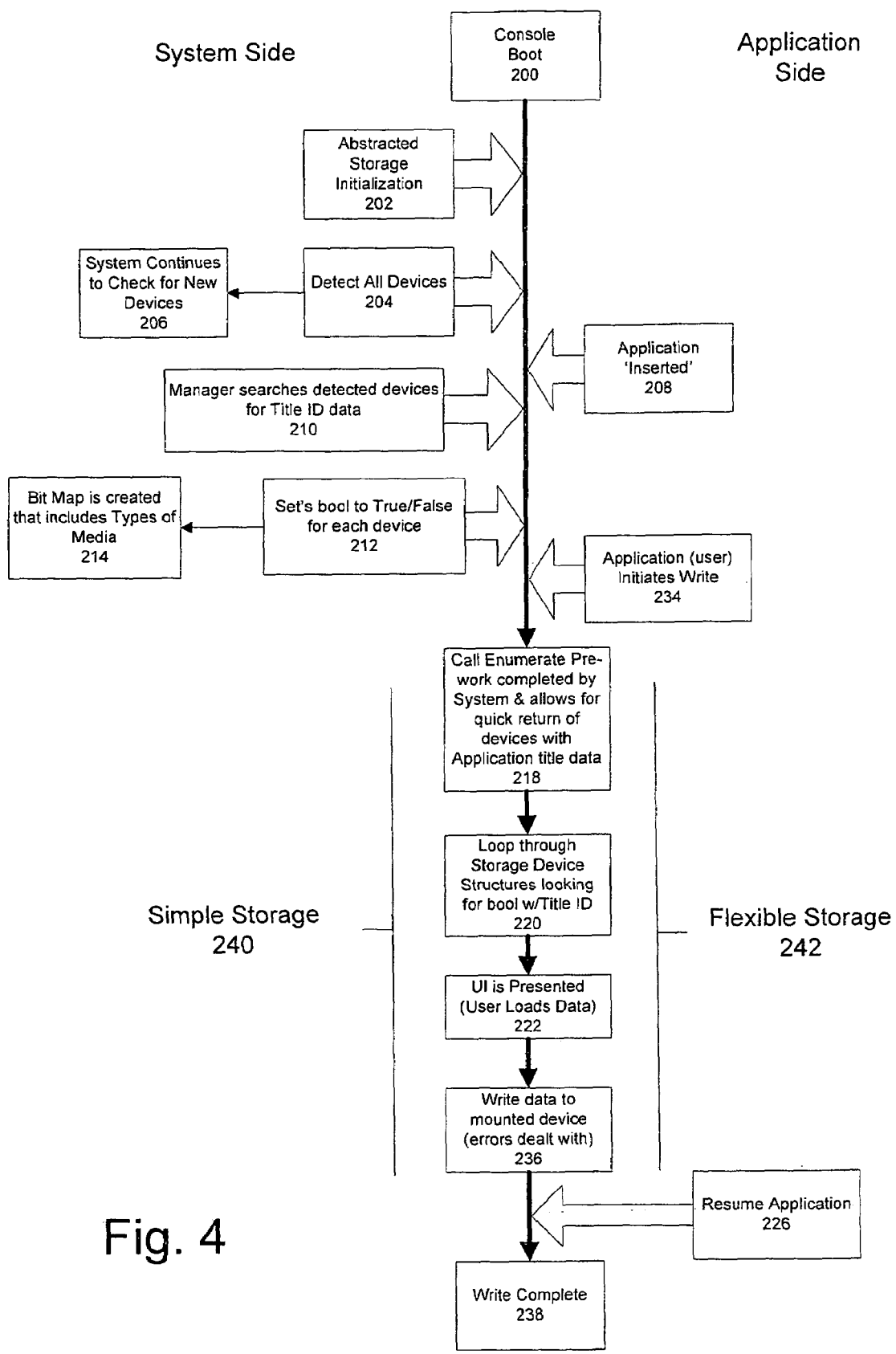
FIG. 4 is a flow chart of the processes performed to save/write data to storage devices.

Referring now to FIG. 4, the processes performed on the exemplary console 100 will now be described for saving data from a storage device or devices. Steps 200-214 are substantially the same as described with reference to FIG. 3. At step 234, a user or application initiated save/write occurs. Steps 218-222 are processed as described above and at step 236, data is written to the mounted device. Control is returned to the application at step 226 and the write is complete at step 238.

For writing data, simple storage 240 and flexible storage 242 options are provided. The simple storage save/write 240 process begins when the user initiates "save data" from application's UI (e.g. application save). For this type of data read, the application calls an API passing a set of parameters indicating the type of data (e.g. save game). Flags associated with the data that tells the system how to process it (e.g. security information to assign to the data), and an identifier indicating the user who owns this data. A system application/API takes control and checks for possible storage locations and estimates save time. The user either accepts default storage location (default storage device is pre-determined) or overrides and selects new location. The system application allows users to go to a memory management area to deal with devices that may be 'full' or 'not enough room available.' The system may digitally sign the data save.

Another API may provide an estimated time to save/load based on latency. This value can be used in the save UI to calculate the 'Save Time' or load time. Specifically, this data will be used to provide an ETA for Read/Write times for end users. This estimate will be used in the System Save UI and will proactively provide end users with useful information on save/load times for various storage devices. For instance, during the boot sequence the system software could check for a networked PC and determine the potential speed of the connection. At the time that a game or user has data to save the system software could use a simple algorithm to calculate the total time needed to save the data (e.g. speed of connection multiplied by the size of data file to be written). It follows that this type of calculation could be made for every connected storage device (e.g. HDD, MU, server space) and be presented to the user in the UI and educate the user for the best save destination.

Next, the system UI writes the data and responds with 'write complete' message to System UI. The System UI deals with status bars or other error messages as required. There are a wide range of errors that the system UI handles, such as remote devices becoming unavailable during the save process or packets being dropped over a wireless home network. Finally, the System UI ends and returns control to the application. A similar operation may be performed to write title data, however, because title data is stored on a local hard drive, it is most likely that the hard drive will exist at all times.

A simple silent save/write is performed to prevent the loss of title data. The Silent Save occurs after the user has selected a storage device. The process for the silent save begins when the application has data that needs to be stored. The application calls an API and informs the system of the storage destination and data name. A system application accesses the location of the original save and mounts the appropriate drive for storage device (e.g. a letter drive for HDD User data). The application then finds the original data file. If the storage device is no longer available then the user is presented a UI asking them to either reconnect destination storage device or pick new storage destination. Also, if the application cannot locate data file to overwrite it determines if there is room to save. If so, it saves, if not, it presents System Save UI to initiate new save data process. The application then initiates a write for data file and the system deals with any errors. The system confirms write and unmounts the corresponding drive, and then the application continues.

Some applications may desire or require more complex data save methods than the simple 'save data' method. For example, these applications may want to create subdirectories, multiple files and/or perform limited writes within a file. In order to accommodate these titles, a lower level set of storage APIs are used for the flexible storage 242 save/write option such that applications are able to access storage at a lower level. The application must handle the various cases of media insertion and removal, enumeration of data across devices and so on.

The flexible storage 242 save/write process begins when the user initiates a 'save data' from application's UI (e.g. save game). The application title checks for available storage devices with low level API that ensures that the console 100 is able to add future storage devices. The application title calls an API to provide an estimate of time to save their data file and then calls and API to allow the user to select a save application name and device and save destination. Next, the system calls an API to mount the storage device and control returns to the application.

Once a storage device has been mounted, the name is passed back to application. The application uses storage APIs to write data to the device (e.g. create directory, etc.) to the appropriate drive (e.g. a letter drive for HDD storage). The application title calls an API to provide information about saved data (e.g. screenshot versus application save, roamable, etc.), and may digitally sign the saved data. The application title error checks every write throughout the application to ensure that the device is persistent and that the device has enough free blocks. Once the application completes the write, the system is informed and the drive is unmounted so the application can resume.

A flexible silent save/write option is provided. The silent save can occur after the user has selected a storage device via a flexible save data write process and is a series of low level APIs that will allow the application title to overwrite a portion of the data file on the storage device (e.g. the 'inventory' slot on the application). With a silent save, when the application title wants to initiate a silent user save, it passes a storage location and name of data file to System which mounts the appropriate storage device using an API. The system finds the original data file. If the storage device is no longer present, the user is presented UI asking them to either reconnect destination storage device or pick new storage destination. If the application cannot locate data file to overwrite it determines if there is room to save. If so, it saves, if not, it presents System Save UI to initiate new simple save process. Control then returns to the application. The application title uses storage APIs to write data to the device (e.g. create directory, etc.) to the mounted drive.

The application then calls an API to provide information about saved data (e.g. screenshot versus application save, roamable, etc.) and may digitally sign the saved data. The application title error checks every write throughout the application to determine if the device is still persistent and has enough free blocks. Otherwise, an error message is displayed. The application completes write and informs the system it is done writing data. The system unmounts the corresponding drive and the application resumes. A similar process may be used to write title data. In addition, an option may be provided to allow applications to create their own application specific UI.

In addition to the above, downloaded content may be stored and retrieved using the simple or flexible read/write processes of the present invention. Auto Updates may be implemented where required downloads that are not found on local devices are automatically downloaded from a server or networked PC. The advantage for this option is that the implementation is transparent to end users.

User created content, as well as system applications, drivers, etc. may also be stored and retrieved using the simple or flexible read/write processes of the present invention. Media files can be played or ripped via a Media Player UI from/to user specified storage locations. Device drivers and system applications may be stored, however, because these are critical file to operation of the console, they are preferably stored to a location that is persistent under all circumstances (e.g., ROM).ok While the present invention has been described in connection with the preferred embodiments of the various Figs., it is to be understood that other similar embodiments may be used or modifications and additions may be made to the described embodiment for performing the same function of the present invention without deviating therefrom.

What is claimed:

1. A method for reading/writing data from one of multiple, diverse storage devices communicatively connected to a gaming console, comprising:

determining a latency for each one of the multiple, diverse storage devices and assigning each one of the multiple, diverse storage devices a persistency level, wherein the persistency level for each storage device is assigned by the gaming console, and wherein internal hard disk drives of the gaming console are assigned higher persistency levels than the persistency levels of local memory units that can be disconnected from the gaming console, local memory units that can be disconnected from the gaming console are assigned higher persistency levels than the persistency levels of storage devices from remote networked PCs, and storage devices from remote networked service servers are assigned higher persistency levels than the persistency levels of storage devices from remote network PCs;

detecting an event requesting to read/write data;

calculating a value for each one of the multiple, diverse storage devices, wherein the value is calculated in accordance with the latency and the persistency level for each storage device;

selecting a default storage device from the multiple, diverse storage devices with a highest value;

presenting a user interface displaying each one of the multiple, diverse storage devices, an estimated time to read/write said data to each one of the multiple, diverse storage devices, and the selected default storage device; and receiving an input selecting a particular storage device out of the multiple, diverse storage devices from which said data is to be read/written.

2. The method of claim 1, further comprising determining said estimated time in accordance with a latency of each storage device.

3. The method of claim 2, further comprising providing a progress status of a read/write to said particular storage device.

4. The method of claim 2, further comprising determining said latency by ascertaining a speed of a connection for each storage device to said gaming console.

5. The method of claim 1, further comprising detecting and enumerating storage devices in response to said event.

6. A computer readable storage medium having stored thereon computer executable instructions for reading/writing data from one of multiple, diverse storage devices communicatively connected to a gaming console, said instructions, when executed by a computer comprises steps for:

determining a latency for each one of multiple, diverse storage devices and assigning each one of the multiple, diverse storage devices a persistency level, wherein the persistency level for each storage device is assigned by the gaming console, and wherein internal hard disk drives of the gaming console are assigned higher persistency levels than the persistency levels of local memory units that can be disconnected from the gaming console, local memory units that can be disconnected from the gaming console are assigned higher persistency levels than the persistency levels of storage devices from remote networked PCs, and storage devices from remote networked service servers are assigned higher persistency levels than the persistency levels of storage devices from remote network PCs;

detecting an event requesting to read/write data;

calculating a value for each one of the multiple, diverse storage devices, wherein the value is calculated in accordance with the latency and the persistency level for each storage device;

selecting a default storage device from the multiple, diverse storage devices with a highest value;

presenting a user interface displaying each one of the multiple, diverse storage devices, an estimated time to read/write said data to each one of the multiple, diverse storage devices, and the selected default storage device; and receiving an input selecting a particular storage device out of the multiple, diverse storage devices from which said data is to be read/written.

7. The computer readable storage medium of claim 6, further comprising instructions to determine said estimated time in accordance with a latency of each storage device.

8. The computer readable storage medium of claim 7, further comprising instructions for providing a progress status of a read/write to said particular storage device.

9. The computer readable storage medium of claim 7, further comprising determining said latency by ascertaining a speed of a connection for each storage device to said gaming console.

10. The computer readable storage medium of claim 6, further comprising instructions for detecting and enumerating storage devices in response to said event.

11. A method for determining latency and persistency of one of multiple diverse storage devices communicatively connected to a gaming console, comprising:

determining, by the console, a connection speed for each one of the multiple, diverse storage devices during a boot process and assigning each one of the multiple, diverse storage devices a persistency level, wherein the persistency level for each storage device is assigned by the gaming console, and wherein internal hard disk drives of the gaming console are assigned higher persistency levels than the persistency levels of local memory units that can be disconnected from the gaming console, local memory units that can be disconnected from the gaming console are assigned higher persistency levels than the persistency levels of storage devices from remote networked PCs, and storage devices from remote networked service servers are assigned higher persistency levels than the persistency levels of storage devices from remote network PCs;

detecting an event requesting to read/write data from a video game executing on the console;

calculating, by the console, a value for each one of the multiple, diverse storage devices, wherein the value is calculated in accordance with the connection speed and the persistency level for each storage device;

selecting, by the console, a default storage device from the multiple, diverse storage devices with a highest value;

presenting a user interface displaying each one of the multiple, diverse storage devices, an estimated time to read/write said data to each one of the multiple, diverse storage devices determined in accordance with said connection speed, and the selected default storage device; and receiving an input selecting a particular storage device out of the multiple, diverse storage devices from which said data is to be read/written.

12. The method of claim 11, further comprising providing a progress status of a read/write to said particular storage device.

13. The method of claim 11, further comprising: detecting and enumerating storage devices in response to said event; and re-determining said connection speed in response to said event.

* * * * *